(12) United States Patent
Dultz et al.

(10) Patent No.: US 7,649,610 B1
(45) Date of Patent: Jan. 19, 2010

(54) METHOD AND DEVICE FOR REDUCING SPECKLE FORMATION ON A PROJECTION SCREEN

(75) Inventors: Wolfgang Dultz, Frankfurt am Main (DE); Gisela Dultz, Franfurt am Main (DE); Leonid Beresnev, Columbia, MD (US); Heidrun Schmitzer, Regensburg (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/958,686

(22) PCT Filed: Mar. 30, 2000

(86) PCT No.: PCT/EP00/02794

§ 371 (c)(1),
(2), (4) Date: Feb. 27, 2002

(87) PCT Pub. No.: WO00/62114

PCT Pub. Date: Oct. 19, 2000

(30) Foreign Application Priority Data

Apr. 12, 1999 (DE) .............................. 199 16 306
May 28, 1999 (DE) .............................. 199 24 519

(51) Int. Cl.
*G02F 1/13* (2006.01)
*G03B 21/14* (2006.01)

(52) U.S. Cl. ........................................ 349/193; 353/79

(58) Field of Classification Search ................ 349/5–9, 349/200–201, 1, 193–194; 353/79
See application file for complete search history.

(56) References Cited

U.S. PATENT DOCUMENTS 3,650,608 A * 3/1972 Baker .......................... 353/69

(Continued)

FOREIGN PATENT DOCUMENTS

DE 195 01 525 4/1996

(Continued)

OTHER PUBLICATIONS

"Perceived Speckle Reduction In Projection Display Systems", IBM Technical Disclosure Bulletin, IBM Corp., vol. 40, No. 7. Jul. 1, 1997, New York, pp. 9-11.

(Continued)

*Primary Examiner*—Dung T. Nguyen
(74) *Attorney, Agent, or Firm*—Kenyon & Kenyon LLP

(57) ABSTRACT

A method and a device for reducing speckle formation on a projection display when working with a coherent light source. In this context, the light coming from the light source, before the projection, may strike an electrically controllable optical element having a spatially inhomogeneous refractive index, passing through the same, the refractive index being varied over time within the projection period. This may lead to an averaging out of the speckle pattern on the projection screen. For purposes of illumination, a multimode light source may be used, and/or the light coming from the light source is separated into a plurality of spatial modes, thereby reinforcing the effect. As an optical element, one may employ a liquid crystal element composed of at least two liquid crystal layers, to which a spatially dependent voltage is applied to generate a spatially dependent refractive index. Its birefringence may be compensated by orientating the layers to one another in appropriate fashion.

19 Claims, 3 Drawing Sheets

U.S. PATENT DOCUMENTS

| | | | |
|---|---|---|---|
| 3,652,956 A * | 3/1972 | Pinnow et al. | 359/278 |
| 3,941,456 A | 3/1976 | Schilz et al. | |
| 4,647,158 A | 3/1987 | Yeadon | |
| 5,532,860 A * | 7/1996 | Hershey et al. | 398/129 |
| 5,586,205 A * | 12/1996 | Chen et al. | 385/29 |
| 6,088,380 A * | 7/2000 | Lawandy | 372/102 |
| 6,130,731 A * | 10/2000 | Andersson et al. | 349/77 |
| 6,331,910 B1 * | 12/2001 | Dultz et al. | 359/246 |

FOREIGN PATENT DOCUMENTS

| | | |
|---|---|---|
| DE | 195 08 754 | 9/1996 |
| DE | 197 10 660 | 9/1998 |
| WO | WO 96/21883 | 7/1996 |

OTHER PUBLICATIONS

Patent Abstracts of Japan, vol. 2000, No. 3, Dec. 10, 1999, JP 11-337888, Kuwabara Koji, Hitachi Ltd., "Speckle Pattern Dispersion Device and Laser Beam Irradiation System".

"Speckle Reduction In Coherent Information Processing", Proceedings of the IEEE, New York, vol. 84, No. 5, May 1, 1996, pp. 765-781.

Patent Abstracts of Japan, vol. 5, No. 99, Apr. 22, 1981, JP 56-043786, Nippon Telegraph & Telephone Corp., Miki Tetsuya, "Semiconductor Laser Combining Apparatus".

* cited by examiner

METHOD AND DEVICE FOR REDUCING SPECKLE FORMATION ON A PROJECTION SCREEN

FIELD OF THE INVENTION

The present invention is directed to a method and a device for reducing speckle formation on a projection screen.

BACKGROUND INFORMATION

Speckle patterns are irregular, fine-grain light distributions which may occur when illuminating white walls, projection screens and other surfaces (hereinafter largely referred to as, for example, projection screens) using widened, coherent light, in particular laser light. The speckle pattern may be formed when a spot of light is imaged on the projection screen, due to the high coherence caused by interference of the light waves scattered at various points on the projection screen. The interference pattern may exhibit the stochastic fine structure of the reflecting screen. The average size of a speckle grain depends on the aperture of the coherently illuminated spot on the screen. The larger the light spot is, the finer is the graininess of the speckle pattern. The contrast in the speckle grains may be determined by the coherence of the light source. The speckle pattern may disappear when the coherence length of the light falls perceptibly below the average roughness of the screen.

It is believed that to optically reproduce images, laser-based projection methods are being used to an increasing degree. In contrast to image rendition using cathode-ray tubes or liquid-crystal displays, the laser projection technique may fundamentally enable a high-quality image to be attained with an unlimited image size. In this context, the laser beam for displaying the image to be rendered may be rasterized similarly to an electron beam in a picture tube via a projection screen.

The speckle formation encountered in projection methods using lasers or other coherent light sources is disadvantageous. Speckles can occur, in particular, when the image is built up from individual image points, line-by-line, and, to this end, laser beams are focused on the projection screen. Due to the small image points, the speckle pattern may be coarse-grained and perceived by the observer as a disturbing glittering of the individual image points.

It is believed that there are various basic approaches for suppressing speckle formation. The reference "Speckle Reduction in Coherent Information Processing", Toshiaki Iwai and Toshimitsu Asakura, Proceedings of the IEEE, vol. 84, no. 5, May 1996, pp. 765-780, may provide an overview of some basic approaches. The methods described can be broken down into methods for controlling spatial coherence, controlling temporal coherence, each implemented by manipulating the light source, spatial scanning, spatial averaging, and speckle reduction through digital image processing.

A pulsed laser light source having a small pulse length may be used, thereby reducing the coherence length of the laser light and minimizing speckle formation. However, this may only permit the use of laser systems, which are able to be simply modulated, externally or internally. Furthermore, the spatial coherence of the laser light can be reduced by passing the laser light through a rotating ground glass screen or by scattering it at one or a plurality of optical diffusers. Coherent laser light may be coupled into a multimode optical fiber and the fiber may be deformed by subjecting it to rotation or vibration. At the end of the fiber, the light may emerge, having been separated into a multiplicity of modes in the local space, each mode having traversed a different optical path and, therefore, having different phase positions. By vibrating or rotating the fiber, the mode distribution may be varied over time. Thus, a temporal and spatial average may be generated over the phase pattern being formed, and an incoherent, even if multimode, light source may be provided. This mechanical approach for thoroughly mixing the modes can adversely affect the stability of the overall arrangement.

To reduce the temporal coherence of the laser light, the wavelength of the laser light may be varied or a plurality of wavelengths may be used at the same time. For example, to reduce speckles, a method based on a change in the wavelengths of laser diodes caused by mode jumps may be used. Other lasers as well, which are subject to random fluctuations, come into consideration for this.

An alternative approach for reducing speckle formation is purportedly discussed in the reference German Patent No. 196 45 976. That reference discusses using a projection screen, whose projection depth is greater than the coherence length, so that the reflected or transmitted wave field becomes incoherent. This can entail that the image points are diffusely enlarged by the surface structure of the screen, as well as the limitation of always having to use a specially prepared screen for image rendition.

The reference PCT Patent Publication No. WO 96/21883 purportedly discusses a projection screen whose surface is formed in irregular fashion, inter alia, for purposes of reducing speckles, such that the Fourier spectrum of the surface exhibits higher frequencies than that of a pixel structure projected onto the screen.

The reference German Patent No. 195 08 754 purportedly discusses a method for reducing the interference of a coherent light beam, the light being polarized variably with respect to location, in a direction perpendicular to the direction of propagation. In this case, the circumstance is utilized that different polarization states of the light are no longer able to completely interfere with one another. It is believed that the required polarization states can be produced, for example, with the assistance of LCD matrices.

The reference German Patent No. 107 10 660 purportedly discusses a device for removing screen speckles when working with scanning laser-image projection, the laser beam being split with the assistance of an ultrasound cell in which density waves travel, by the diffraction of the density waves into various orders of diffraction of different frequencies. The beam components are superposed using a lens. In this manner, a moving system of interference patterns is apparently formed on the projection screen, so that the forming speckles overlap one another in the eye of the observer due to the integration process, and become averaged out in time and space.

The reference U.S. Pat. No. 3,941,456 A purportedly discusses a device for reducing granulation, which occurs when transmitting optical information using a high-grade, coherent light beam. The light beam propagates through an ultrasound cell in which, depending on the excitation, standing or traveling density waves may form. The density waves may influence the refractive index locally, so that the light beam propagates through zones having different refractive indices, resulting in a reduction in the granulation.

The reference "Perceived Speckle Reduction in Projection Display Systems", IBM Technical Disclosure Bulletin, U.S.A., IBM Corp., New York, vol. 40, no. 7, Jul. 1, 1997, pages 9-11, XP 000728388, ISSN 0018-8689, purportedly discusses reducing speckles in that the light beam propagates through a liquid crystal, whose refractive index is influenced by an electrical field.

The reference U.S. Pat. No. 4,647,158 purportedly discusses a method and a device used to convert a beam of coherent light using a controllable diffraction grating into a beam of incoherent light.

SUMMARY OF THE INVENTION

The present invention provides a method and a device for reducing speckle formation, which will avoid some disadvantages of the related art.

An exemplary device and/or exemplary method of the present invention is directed to reducing speckle formation on a projection screen, using a coherent light source, including an electrically controllable optical element having a spatially inhomogeneous refractive index, which is variable over time, the optical element being configured between the light source and the projection screen, characterized in that the electrically controllable optical element includes a liquid crystal element, to which a temporally variable voltage gradient may be applied to control the temporally and spatially dependent refractive index.

An exemplary method of the present invention is directed to operating such a device and may be characterized in that the light coming from the light source, before the projection, strikes an electrically controllable optical element having a spatially inhomogeneous refractive index, passing through the same, the refractive index being varied over time within the projection period.

A functional principle of an exemplary embodiment and/or exemplary method of the present invention is as follows. The light generated by the coherent light source, in particular by a laser, strikes the optical element before the actual projection device, which directs the light to the projection screen, and, in fact, in a simple embodiment of the present invention, always at a fixed angle of incidence. The optical element may have the property of deflecting the light in a manner that is varied over time. Because the refractive index of the optical element is spatially inhomogeneous over the irradiated surface, the incident beam is deflected in a direction that differs from the initial beam direction. To achieve the desired effect when the given refractive index profile exhibits maximal differences in refractive indices, the beam may be widened before striking the light-deflecting optical element, and, after that, collimated again. This spatial deflection of the beam is modified by varying the refractive index profile over time. Even at the smallest angle variations of less than one degree in the beam direction, this leads to an averaging out of the speckle patterns on the projection screen. However, in the simple variant of the present invention, it also may lead to a slight widening of the light spot on the screen. To ensure that the eye merely perceives an averaged image, the temporal variation in the refractive index should be carried out repeatedly within the reaction time of the eye, i.e., the optical element should be driven at switching frequencies of about 100 Hz. In the case of a rasterized projection of an image, where the projected light spot dwells for just a certain time on a projection location on the screen, the refractive index may be repeatedly temporally varied within this dwell period.

Another exemplary embodiment and/or exemplary method of the present invention, the thus achieved effect of speckle reduction is reinforced by using a multimode light source, and/or by separating the light coming from the light source into a plurality of spatial modes. Thus, the light striking the optical element is composed of a plurality of modes, each having a particular spatial characteristic, such as beam profile and angle of emergence, which are superimposed on one another. Because of the inhomogeneous refractive index, the individual modes are variably spatially deflected; they are spatially intermixed due to the temporal variation of the refractive index. Therefore, the speckle patterns are averaged out. In the process, the need for mechanically intermixing by using vibrators or rotating elements in the optical path of rays is advantageously eliminated. Essentially the same effect is achieved, however. In this context, the differences in refractive indices are to be selected such that no substantial widening in the projected light spot occurs.

In the case of rasterized imaging of the light on the projection screen, the temporal variation in the refractive index of the optical element for averaging out the speckle patterns is to be selected such that the spatial modes are spatially deflected multiple times within the dwell period of one image spot on the projection screen, at least, however, once between two images.

In a further exemplary embodiment and/or method of the present invention, to split up the light radiated by a single-mode light source, it may be coupled into a first multimode optical fiber. Depending on the in-coupling conditions and, as the case may be, also on the mechanical stressing of the fiber, modes other than the original mode are excited and transmitted, so that, after propagating through the fiber, the light is composed of a superposition of a plurality of spatial modes. The light then strikes the optical element. Depending on the location of incidence, the individual spatial components are deflected in slightly different directions due to the different refractive indices.

Linked to the optical element is an additional optical fiber, whose light is used for the projection. By coupling the light into this fiber, the light may be fed in a defined manner to the actual projection device. In this manner, one may avoid a "blurring" of the light spot on the projection display, while the effect of averaging the speckles is retained.

In a further exemplary embodiment and/or exemplary method, the fiber that is connected downstream from the optical element is a multimode fiber, which, as the case may be, is added to the first fiber connected upstream from the optical element. Since the deflection directions are varied by the optical element, in this case of the second multimode fiber, different modes are excited and transmitted each time. Thus, the second fiber renders possible a further intermixing and averaging of the coherence effects.

In a further exemplary embodiment and/or exemplary method, as an optical element, a liquid crystal element may be used. Liquid crystals can be semi-liquid solutions or mixtures of large molecules, which orient themselves to one another in the liquid, resulting in a birefringent liquid crystal layer. The birefringence may be influenced by an externally applied electric field. In the process, both a voltage-proportional variation, as well as a non-linear, step-like variation occurs in the case of a threshold voltage. Because of these electro-optical properties, liquid crystals may be used to control the phase of a light wave passing through them. In an exemplary embodiment, to convert the present invention to practice, a liquid crystal element may be used, for example. A spatially variable voltage, for example a voltage gradient, is applied thereto to produce a spatially inhomogeneous refractive index distribution. When working with elements having voltage-proportional birefringence, the birefringence changes accordingly. A thus produced birefringent gradient acts for a polarization direction as a refractive index gradient, which deflects a light beam of this polarization. When working with the small refractive index gradients that can be generated within the operating range and the small layer thicknesses of available liquid-crystal cells, the spatial deflection is slight, but suffices for mixing modes along the lines of the present invention. As described above, the effect may be reinforced by adding a downstream multimode fiber.

A further exemplary embodiment and/or exemplary method is directed to a device having an optical element, which remains isotropic in response to the application of a voltage, i.e., it may allow a spatially varying refractive index to be established, but it does so without being birefringent. The birefringent properties of simple liquid-crystal elements having one single liquid crystal cell (partial element) lead to a change in the polarization when passing through the element. For most applications, however, it is beneficial and desirable to have a polarization-independent manipulability.

Liquid-crystal elements, which remain isotropic in response to the application of a voltage, have been proposed by the non-prepublished German Patent Application No. 198 52 890.6. They are composed of two or more liquid-crystal layers as partial elements, in particular of helical, smectic, ferroelectric liquid crystals, which are so oriented in relation to one another, that their birefringence is compensated for all applied voltages. For example, two layers are aligned orthogonally to one another, so that the slow axis of the first layer is aligned perpendicularly the fast axis of the second layer, and the fast axis of the first layer is aligned perpendicularly the slow axis of the second layer. An isotropic refraction of the entire layer sequence remains; the polarization of transmitted light is retained.

In accordance with the present invention, the optical elements described in German Patent No. 198 52 890.6 are further developed in such a way that, instead of a constant voltage, a voltage gradient is produced over the surface of the cells. The spatially dependent voltage is to be selected at the various cells of the optical element such that the polarization of the light is the same independently of the pass-through location upstream and downstream from the optical element. A further exemplary embodiment and/or exemplary method is directed to using an optical element made up of two such liquid crystal layers, the slow axis of the first layer being aligned perpendicularly the fast axis of the second layer, and the fast axis of the first layer being aligned perpendicularly the slow axis of the second layer. A voltage gradient is applied to both layers so that the voltage at one location is more or less the same, orthogonally to the beam direction for both layers. It may suffice to have one voltage gradient in one spatial direction. The voltage gradient may be applied alternately in the x- and y-directions. Alternatively, a rotating field can be applied to the liquid crystal layers.

To average out the speckle patterns, it is necessary to change the spatially dependent refractive index by switching over the applied voltage. This is done repeatedly over the reaction time of the eye. It is believed that laser projection systems produce the image on a point-to-point basis using a raster procedure. In such a case, the image spot must dwell on the projection screen for a time period t1, which is greater than the time period t2 of the refractive index variation, preferably at least five times t2.

Accordingly, for displays having, for example, 1000 times 1000 image points and 100 individual images per second, the required switching time for the liquid crystal cell would amount to approximately 0.5 GHz. At the present time, such high switching frequencies can, in fact, be reached using electrooptical crystals, but not, it is believed, by using liquid crystal cells. To improve the image quality of such highly resolving systems as well, by reducing the speckle formation, projection systems may be employed which not only use one laser, but an entire laser array, for example columns having a plurality of lasers. When such a system is used, a greater number of lines of the image can be simultaneously constructed and projected. In this manner, one reduces the period of time t1 and, accordingly, also the requisite switching time t2 when each individual projection laser is provided with an optical element, in particular a liquid crystal element, along the lines of the present invention. If 100 lasers are simultaneously used for projection purposes in the above example, then switching frequencies of about 5 MHz are required. This appears to be already within the range of present-day liquid crystal development.

In many cases, however, an adequate speckle suppression can even be effected by a switching frequency that is on the order of the image frequency of the projection system.

DETAILED DESCRIPTION

Figure 1:
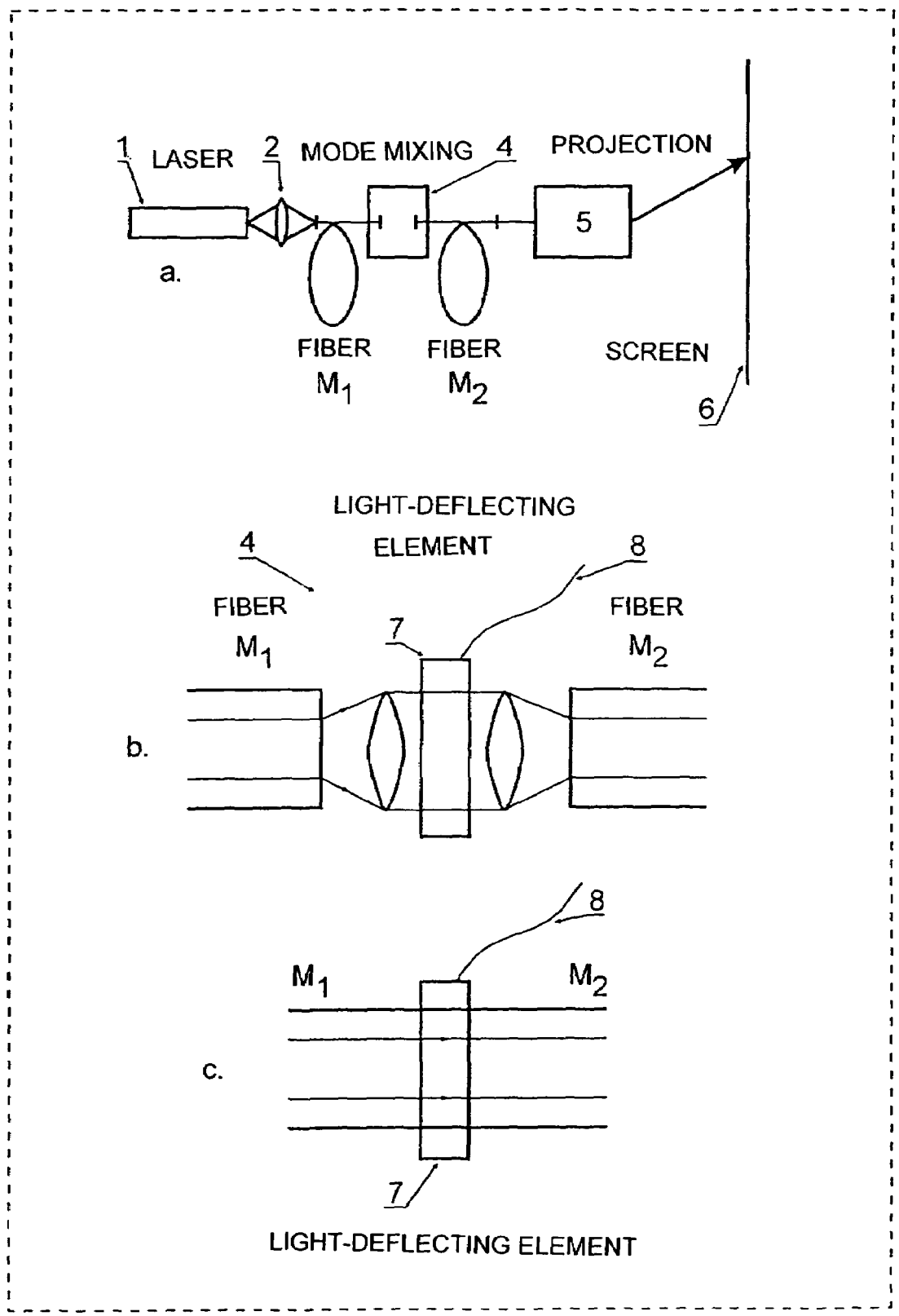
FIG. 1a shows an exemplary laser projection system having a device for reducing speckle formation.
FIG. 1b shows an exemplary laser projection system having a device for reducing speckle formation.
FIG. 1c shows an exemplary laser projection system having a device for reducing speckle formation.

FIG. 1a shows a laser projection system having a device for reducing speckle formation through mode mixing. The projection system includes a laser 1 as a light source. In color displays, a plurality of lasers having different wavelengths are used. The laser light may be coupled by an optical arrangement 2, shown here as a lens, into a first multimode optical fiber M1, whose output is mapped onto the input of a second multimode optical fiber M2. Compare FIG. 1b. Situated at the output of the second multimode optical fiber M2 is the actual projection unit 5, which may be used to project the laser beam point-by-point onto projection screen 6.

The mode-mixing unit 4 is shown in FIG. 1b. The light emerging from first multimode fiber M1 is already constituted of a superposing of a plurality of modes. It strikes an optical element 7 having a spatially inhomogeneous, electrically variable refractive index. The electrical driving of element 7 is indicated by a signal line 8. Optical element 7 is capable of deflecting incident and transmitted light in a spatially dependent fashion. For this reason, the image of the in-coupled light changes at the output of element 7 and at the input of second fiber M2, respectively. The individual modes from fiber M1 are coupled, as spatially altered modes, at various locations and at various angles, into second multimode fiber M2 and, consequently, excite in M2 a mode that differs from the original one. This appears at the output of M2 and, therefore, on projection screen 6, likewise at a slightly different location. If the light-deflecting properties of optical element 7 are quickly varied within the reaction time of the eye, the result may be that the individual modes are scrambled on projection screen 6. Since each mode has a different phase lag, the speckle patterns are averaged out and become blurred on the projection screen. In this context, the image spot dwells on the projection screen for a time period t1, which is greater than the time period t2 of the refractive index variation, preferably at least five times t2.

An averaging of speckles among various individual images requires only multiple variations in the refractive index within the reaction time of the eye. For this, about 1000 Hz suffice.

Figure 2:
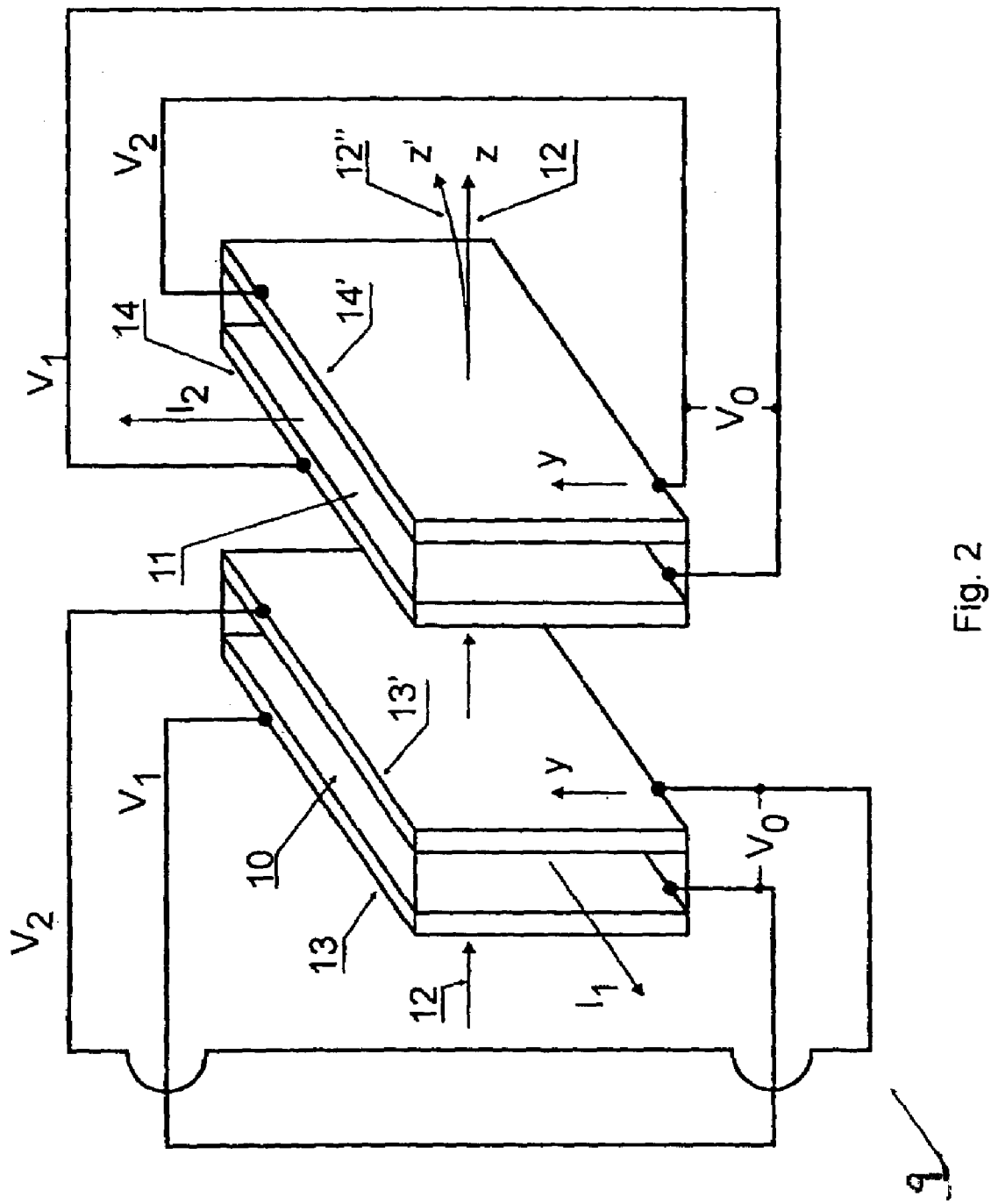
FIG. 2 shows an exemplary switchable liquid crystal element for generating a refractive index gradient.

FIG. 2 shows a switchable liquid crystal element 9 having birefringence that may be compensated, for producing a refractive-index gradient. Liquid crystal element 9 is composed of two cells, each having a liquid crystal layer 10, 11, which is disposed between two transparent electrodes 13, 13', and 14, 14', respectively. The molecules orient themselves within the layers, it being possible to influence the electrooptical properties by the voltage applied between the particular electrodes. The orientations of the indicatrices of the two liquid crystal layers 10, 11 are described by vectors 11 and 12. They are oriented in a direction normal to one another and to the beam direction of incident light beam 12. In accordance with the present invention, in an exemplary embodiment and/or exemplary method a voltage gradient is applied to both cells, in a direction normal to the beam direction, in this case in the y-direction. The spatial voltage characteristic is to be selected, in this context, such that voltage V(y) at locus y is the same for both cells. Consequently, the orthogonal alignment of the indicatrices is retained for each y-value, so that layer packet 10, 11 remains isotropic. By properly selecting the resistance of the electrodes, the current is kept low in the electrodes.

To set the average cell voltage, a voltage V0 is applied to both cells at locus y=y0. Applying the voltage gradient deflects light beam 12, which is incident upon the cells at right angles, slightly in the y-direction; as schematically output directions 12' and, subsequent to switching over, by 12", respectively. This deflection may be used for mode mixing between two multimode glass fibers, e.g., in accordance with FIG. 1, and, thus, for suppressing the formation of speckle patterns in accordance with the present invention.

Figure 3:
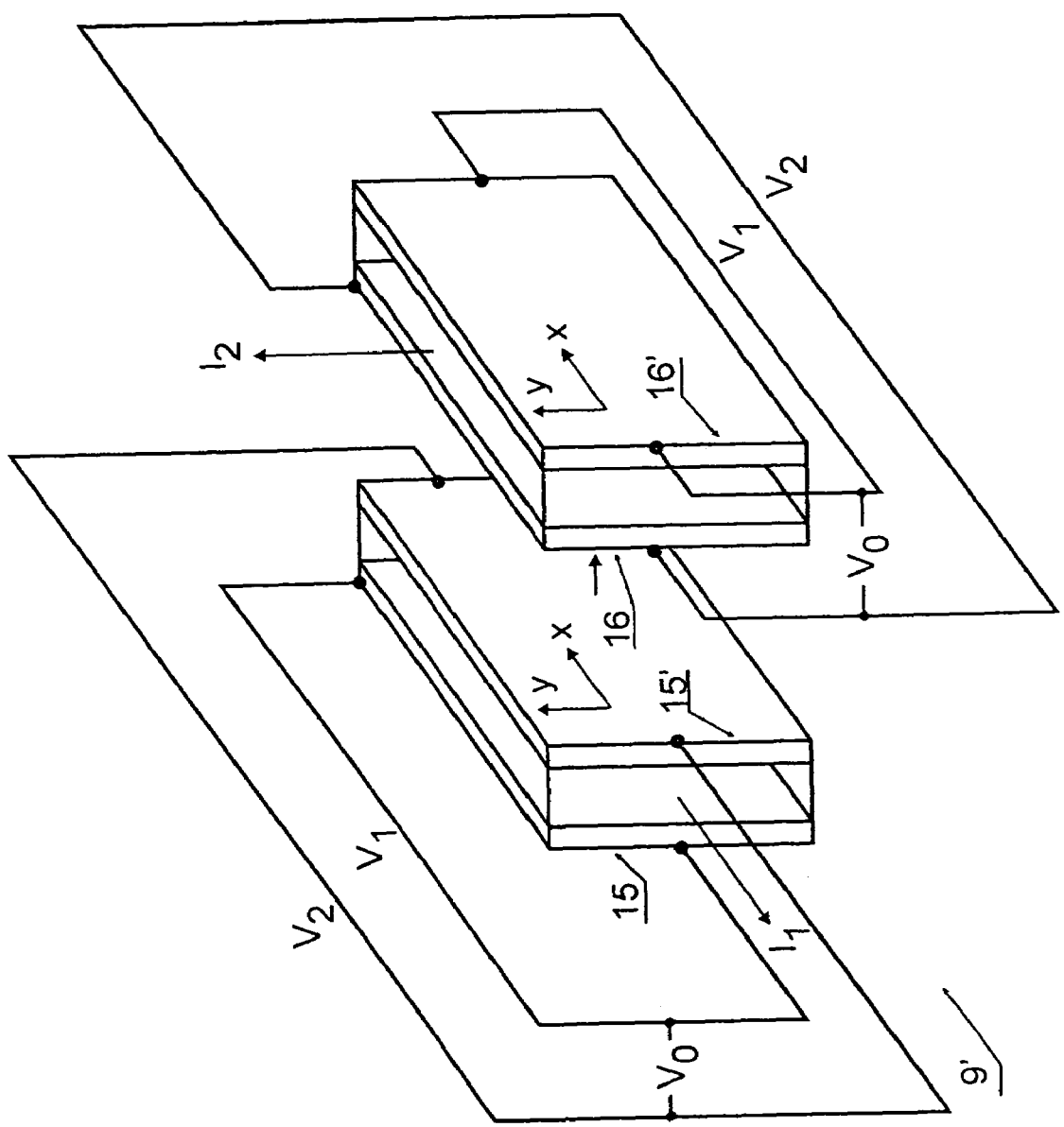
FIG. 3 shows an exemplary switchable liquid crystal element for generating a refractive index gradient.

An improvement in speckle reduction through intensified mode intermixing may be attained by using liquid crystal elements having a more complex deflection property. An example of such a liquid crystal element 9' is shown in FIG. 3. Its structure that includes two liquid crystal layers 10, 11 essentially corresponds to that of FIG. 2. In contrast to the liquid crystal element of FIG. 2, here electrodes 15, 15' and 16, 16', respectively, are additionally provided. They may be used to apply a voltage gradient to the particular cell, simultaneously or alternatively to the voltage gradient in the y-direction, perpendicularly thereto in the x-direction. Preferably, the direction is quickly changed. As a result, the direction of the voltage gradient and, thus, the deflection direction of the incident light may be altered for the intermixing of the modes. Here, the equalization condition for compensating for the birefringence of the individual cell is the matching of the voltages in the individual cells at each irradiated locus (x, y).

The present invention is advantageously suited for commercial use, to improve the image quality of laser projections systems by suppressing speckle patterns.

What is claimed is:

1. A device for reducing speckle formation on a projection screen using a coherent light source, comprising:

an electrically controllable optical element having a refractive index, the refractive index being variable over time, the electrically controllable optical element being configured between the light source and the projection screen, the electrically controllable optical element including a liquid crystal element to which a temporally variable voltage gradient is applicable to establish and control the refractive index as a spatially inhomogeneous refractive index, and a first multimode optical fiber being configured to separate light from the light source into a plurality of spatial modes the first multimode optical fiber being connected upstream from the electrically controllable optical element.

2. The device of claim 1, wherein the liquid crystal element includes at least two liquid crystal layers, the at least two crystal layers being disposed one behind another in a path of rays, each of the at least two liquid crystal layers having a respective fast and a respective slow optical axes, the respective fast and the respective slow optical axes being disposed in parallel to the respective liquid crystal layer of the at least two liquid crystal layers, the respective fast and the respective slow optical axes being rotated with respect to each other so that a polarization of light upstream from the liquid crystal element is same as a polarization of light downstream from the liquid crystal element.

3. The device of claim 1, wherein the liquid crystal element includes a first liquid crystal layer and a second liquid crystal layer, each of the first and second liquid crystal layers having a respective fast and a respective slow axes, the slow axis of the first liquid crystal layer being aligned perpendicularly with the fast axis of the second liquid crystal layer and the fast axis of the first liquid crystal layer being aligned perpendicularly with the slow axis of the second liquid crystal layer.

4. The device of claim 1, further comprising a second multimode optical fiber being disposed at an output of the electrically controllable optical element.

5. The device of claim 1, further comprising an electrically controllable light-deflecting element configured to variably deflect individual modes of the first multimode optical fiber depending on a control voltage, the electrically controllable light-deflecting element being disposed downstream from the first multimode fiber.

6. The device of claim 5, further comprising a second multimode optical fiber disposed downstream from the electrically controllable light-deflecting element, wherein the individual modes of the first multimode optical fiber is configured to be variable coupled into the second multimode optical fiber depending on the control voltage.

7. The device of claim 5, wherein the electrically controllable light-deflecting element is a liquid crystal element to which a voltage gradient is applied and any dependency of polarization direction of the light is canceled due to compensation in at least two partial elements of the liquid crystal element.

8. The device of claim 7, wherein an electric rotating field is applied to each of the at least two partial elements of the liquid crystal element, so that the voltage gradient and, thus, the deflecting direction assume alternating directions in space.

9. The device of claim 7, wherein a respective fast and a respective slow axes of the at least two partial elements of the liquid crystal element are configured aligned perpendicularly to each other.

10. The device of claim 5, wherein the electrically controllable light-deflecting element is a liquid crystal element to which a voltage gradient is applied and any dependency of polarization direction of the light is canceled due to compensation in at least two liquid crystal layers of the liquid crystal element.

11. A method for operating a device for reducing speckle formation on a projection screen using a coherent light source, comprising:

providing a light from the light source;

striking with the light an electrically controllable optical element of the device, disposed between the light source and the projection screen, having a refractive index before a projection; and passing through the electrically controllable optical element, wherein the refractive index is varied over time within a projection period, wherein the electrically controllable optical element including a liquid crystal element to which a temporally variable voltage gradient is applicable to establish and control the refractive index as a spatially inhomogeneous refractive index.

12. The method of claim 11, wherein the light source is a multimode light source.

13. The method of claim 11, wherein before striking the electrically controllable optical element, further comprising separating the light from the light source into a plurality of spatial modes superposed on one another.

14. The device of claim 13, wherein the light from the light source is coupled into a multimode fiber.

15. The method of claim 11, further comprising varying a refractive index profile of the electrically controllable optical element within a dwell period of an image spot on the projection screen for rasterized imaging of the light onto the projection screen.

16. The method of claim 11, wherein, after propagating through the optical element, the light is coupled into an optical fiber.

17. The method of claim 11, further comprising coupling the light into a first multimode fiber and propagating through the first multimode fiber.

18. The method of claim 11, wherein the optical fiber is a multimode fiber.

19. A device for reducing speckle formation on a projection screen using a coherent light source, comprising:

an electrically controllable optical element having a refractive index, the refractive index being variable over time, the electrically controllable optical element being configured between the light source and the projection screen, the electrically controllable optical element including a liquid crystal element to which a temporally variable voltage gradient is applicable to establish and control the refractive index as a spatially inhomogeneous refractive index;

a first multimode optical fiber being configured to separate light from the light source into a plurality of spatial modes, the first multimode optical fiber being connected upstream from the electrically controllable optical element;

a second multimode optical fiber disposed downstream from the electrically controllable light-deflecting element, wherein the individual modes of the first multimode optical fiber is configured to be variable coupled into the second multimode optical fiber depending on the control voltage, wherein the electrically controllable light-deflecting element is a liquid crystal element to which a voltage gradient is applied and any dependency of polarization direction of the light is canceled due to compensation in at least two partial elements of the liquid crystal element.

* * * * *